United States Patent

[11] 3,614,035

[72] Inventors George R. Buynak
Cuyahoga Falls;
Nicholas D. Diamantides, Cuyahoga Falls;
Richard H. Smith, North Canton, all of Ohio
[21] Appl. No. 343,675
[22] Filed Feb. 10, 1964
[45] Patented Oct. 19, 1971
[73] Assignee Goodyear Aerospace Corporation
Akron, Ohio

[54] CHANGE DETECTOR
2 Claims, 4 Drawing Figs.

[52] U.S. Cl............................................ 244/77,
244/3.17, 343/5, 250/219
[51] Int. Cl............................................ B64c 13/50
[50] Field of Search............................................ 343/5 NN,
100.7, 7 ED; 250/219, 220; 88/14 E; 244/3.15,
3.16, 3.17, 77

[56] References Cited
UNITED STATES PATENTS

| | | | |
|---|---|---|---|
| 1,135,919 | 4/1915 | Pilkington | 88/14 |
| 2,427,256 | 9/1947 | Butscher | 88/14 |
| 2,460,350 | 2/1949 | Hinmon | 88/14 |
| 2,660,087 | 11/1953 | Domeshek | 88/14 |
| 2,679,636 | 5/1954 | Hillyer | 88/14 |
| 2,871,759 | 2/1959 | Sconce et al. | 88/14 |
| 2,898,801 | 8/1959 | Rockafellow | 88/14 |
| 2,912,761 | 11/1959 | Woodward et al. | 33/20 |
| 2,952,075 | 9/1960 | Davis | 33/1 |
| 3,102,260 | 8/1963 | Mihelich | 343/5 |
| 3,209,352 | 9/1965 | Buck et al. | 343/7 |
| 3,211,898 | 10/1965 | Fomenko | 235/181 |

Primary Examiner—Richard A. Farley
Attorney—A. H. Oldham

CLAIM: 1. In a target change detector adapted for combination with a reconnaissance aircraft, the combination of a reference transparent scene film, a film drive means, a cathode-ray tube adapted to scan the total area of the transparent film with nominal raster technique, a photomultiplier adapted to receive the scanning beam of the cathode-ray tube through the transparent film, lens means to properly direct the scanning beam of the cathode-ray tube to the transparent film and to the photomultiplier to produce video signals, a vidicon adapted to electronically image a comparison scene of the earth beneath the aircraft and produce video signals, a pair of wide-band electronic amplifiers adapted to receive the video signals from the vidicon and the photomultiplier respectively, the amplifier for the vidicon being set for a positive output signal, the amplifier for the photomultiplier being set for a negative output signal, a summer unit adapted to receive the video signals of opposite polarity from the amplifiers to produce a difference signal, said difference signal being the difference between the reference transparent film signal and the comparison vidicon signal, a comparison guidance system section adapted to compare the vidicon image with the film image to keep the aircraft flying on the proper course, switch means between the vidicon and its amplifier, said switch adapted to switch the vidicon signal to the cathode-ray tube input, switch means between the photomultiplier and its amplifier, said second-mentioned switch adapted to shift the photomultiplier signal to the comparison guidance system and means to change the switches synchronously together to change the apparatus from the change detector section to the comparison guidance system.

QUOTIENT DIFFERENCE METHOD

INVENTORS:
GEORGE R. BUYNAK
NICHOLAS D. DIAMANTIDES
BY RICHARD H. SMITH

ATTORNEY

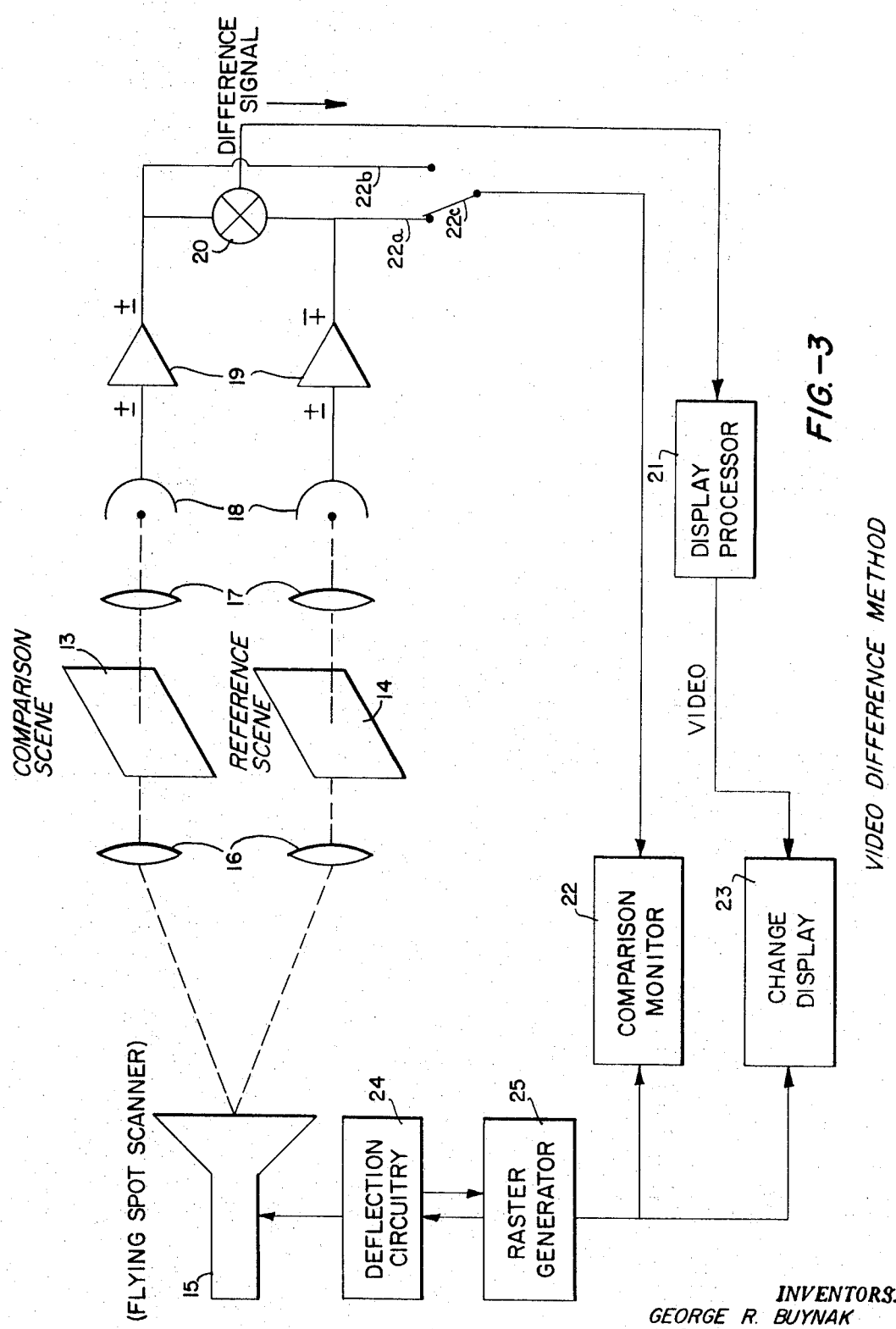

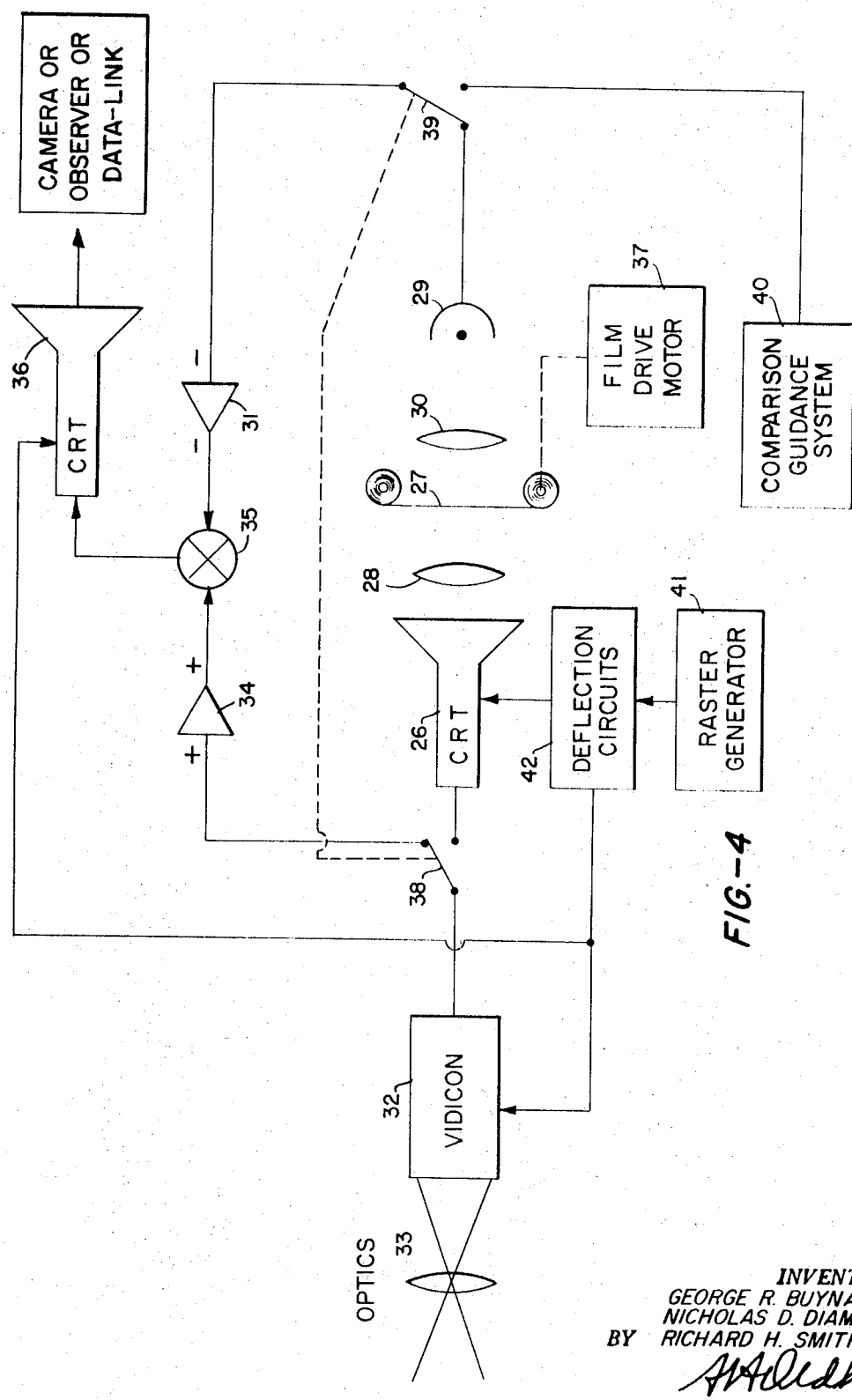

CHANGE DETECTOR

CHANGE DETECTOR

This invention relates to a change detector, and more particularly, to means to compare photographs, electronic pictures, or to compare photographs with actual televised pictures to determine if areas of the earth's terrain have been changed in any manner, such as structural construction or destruction, in the time interval elapsed between the taking of the pictures to be compared.

Heretofore it has been known that reconnaissance missions with photographic intent have been performed by many countries for defensive purposes. Usually, these missions are aerial reconnaissance missions either by aircraft or satellite, and involve taking photographs, either electronically or on film, of large sections of the earth's surface. It has been the usual procedure for persons skilled in the art of interpreting reconnaissance photographs to compare a picture of a certain area taken on a certain date with another picture of the same area taken on a later date to see if there has been any change of the surface terrain involving a military nature. This procedure requires a considerable degree of skill on the part of the person examining the pictures, it is particularly time consuming, and has inherent human weaknesses. Further, it is expensive, and cannot provide the proper degree of coverage necessary to adequately interpret the voluminous amounts of reconnaissance pictures that must be taken as a defensive measure in the world today.

It is the general object of the invention to avoid and overcome the foregoing and other difficulties of and objections to prior art practices by the provision of an electronic target change detector which compares two photographs by combining the differences in their images on a cathode-ray tube to show differences or changes that have occurred in the time lapsed between the taking of the pictures.

Another object of the invention is to provide a change detector machine that possesses capabilities greater than man in memory, data handling, and rapid transfer of data, to thereby permit the skilled, highly trained photointerpreter to concentrate on the details of the changed areas, where the highest probability of significant data exists.

Another object of the invention is to provide an electronic target change detector system which obviates the need for a detailed analysis should the detector indicate no change.

Another object of the invention is to provide an electronic target change detector which can operate in combination with a reconnaissance aircraft operating on a comparison guidance technique to data-link only change detection information to thereby eliminate the voluminous information now data-linked by these aircraft.

Another object of the invention is to provide a change detector to detect additions or movements of objects into the area, the removal of objects from the area, and the movement or repositioning of objects within the area.

Another object of the invention is to provide an electronic change detector which compares an electronic image of a certain area taken at a certain time with an electronic image of the same area taken at a later time, and which displays the comparison on a cathode-ray tube indicating no change, or pinpointing the areas where change has occurred, and with means to manually or automatically register the change data from the images compared.

The aforesaid objects of the invention, and other objects which will become apparent as the description proceeds, are achieved in one embodiment of the invention by providing in a change detector the combination of a reference scene and a comparison scene, means to register the scenes, means to compare the scenes after registration, means to display the comparison to detect changes between the scenes, means to reject changes of an unimportant nature, means to collect data in regard to the changed areas, and with the entire apparatus operating very effectively and automatically in a short period of time.

For a better understanding of the invention reference should be had to the accompanying drawings, wherein:

FIG. 3 is a block diagram of another form of the comparison and difference detector section utilizing the video difference method, and also including the display processor and changed display sections; and FIG. 4 is a block diagram of a change detector section adapted for utilization in conjunction with a comparison guidance section of a reconnaissance aircraft.

Figure 1:
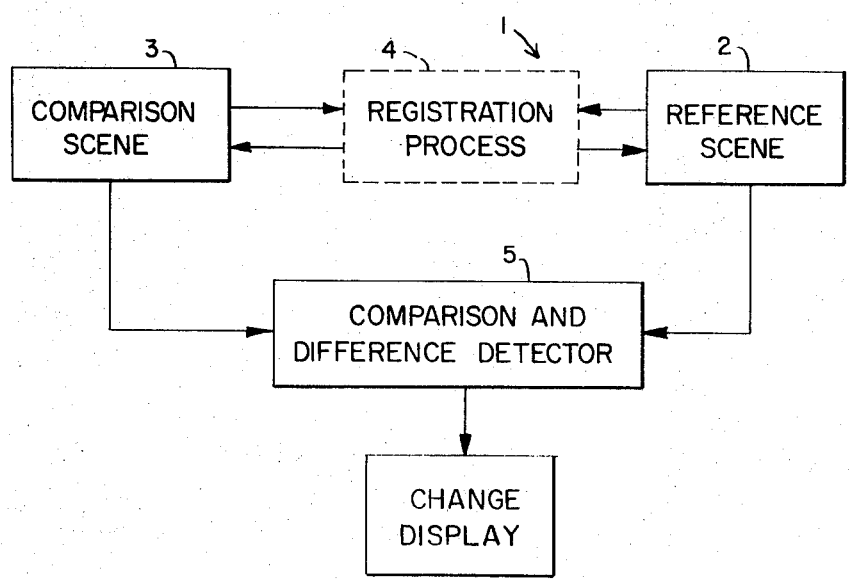
FIG. 1 is a block diagram of the basic and fundamental units comprising the invention for comparing a reference scene and a comparison scene.

With specific reference to the form of the invention illustrated in the drawings, and looking at FIG. 1, the numeral 1 indicates generally a change detector apparatus utilizing a reference scene 2 and a comparison scene 3. The two selected images 2 and 3 are inserted into the change detector and scene information is brought into registration by a registration process 4 utilizing an automatic cross correlation technique as completely described in U.S. Pat. application Ser. No. 144,010 filed Oct. 6, 1961, now Pat. No. 3,194,511, Ser. No. 94,370 filed March 8, 1961, and Ser. No. 843,034 filed Sept. 24, 1959, now Pat. No. 3,459,392. Registration normally requires four degrees of freedom namely horizontal, vertical, rotational, and magnification. This is very quickly and accurately done according to the references heretofore mentioned.

After the scenes 2 and 3 have been properly registered, they are subjected to a comparison and difference detection in the detector 5 whereby each scene is examined in detail and a comparison is made resulting in a display signal proportional to the difference between the two scenes. The resultant difference signal that is proportional to all the differences between the comparison and reference scenes is then displayed in the change display 6. While this display 6 permits quick identification of those locations where changes have occurred between scenes, it is not limited to changes that may have military significance. Examples of undesired changes are the existence and orientation of shadows, cloud cover, and system noise. It is therefore desirable to reject or filter these differences, which have for the most part little military significance and this process will be more fully explained later.

Figure 2:
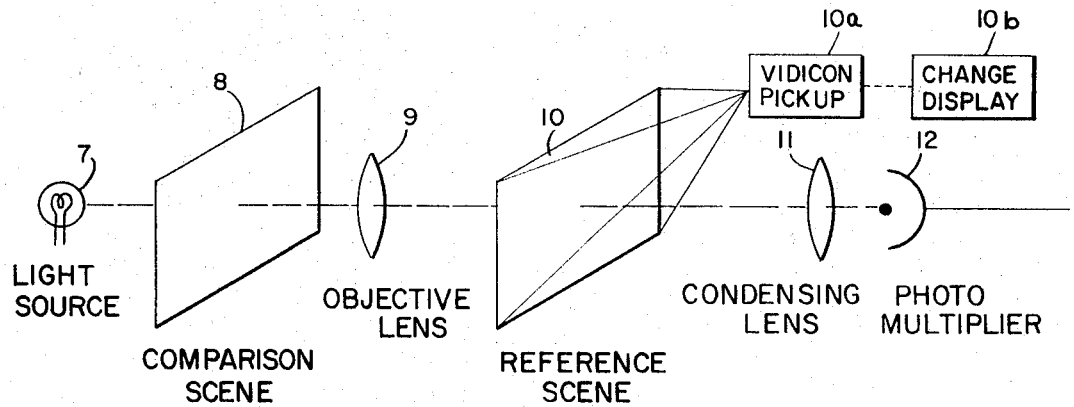
FIG. 2 is a diagrammatic sketch of one form of the comparison and difference detector utilizing the quotient difference method.

One method of comparison and difference detection is shown in FIG. 2, wherein a light source 7 backlights a transparent comparison scene 8. The projected image from the comparison scene 8 is focused by an objective lens 9 onto a transparent reference scene 10. Usually the comparison scene 8 will be a negative transparency while the reference scene 10 will be a positive transparency, or vice versa. The comparison scene 8 and the reference scene 10 will be in registration so that the image of the comparison scene projected onto the reference scene 10 will be in exact registration therewith. During the registration of the two scenes, a photomultiplier 12 is used as described in the above-mentioned map-matching reference. After the images are in registration, the amount of light that is transmitted through the reference scene 10 is a measure of the similarity or difference between the two scenes. Readout of the quotient-difference type change detector is accomplished by viewing the reference scene 10 with the light image of the comparison scene 8 projected on it. This can be done either directly or remotely through the use of a closed circuit TV system such as by a vidicon pickup 10a supplying an input signal into a video change display 10b. An alternate method of readout consist of backlighting the comparison scene 8 with a flying spot scanner. The photomultiplier 12 merely converts the visual image into an electronic signal, which signal can be properly amplified and used to modulate a cathode-ray tube to thereby present the combined scenes in registration to detect changes in the scenes compared. This method is normally called the quotient-difference method, as it results from the physical video combination of the scenes compared. If there are no differences between the comparison scene 8 and the reference 161 scene 10, the resultant readout will be nothing but an unmodulated gray image, because one transparency is a positive and the other a negative thereby resulting in a gray level if there are no differences between the transparencies. However, if there are any differences between the scenes, the resultant output will show up as either a dark or light change to the normally gray level which will be readily discernable.

Another possible method of operation for the comparison and difference detector section 5, of FIG. 1, is shown in FIG. 3, wherein a comparison scene 13 and reference scene 14 in the form of transparencies and properly registered are scanned with a flying-spot scanner 15. In this system the scanning beam is divided by a split optical system with objective lenses 16 focusing the scan beam on the respective scenes, and condensing lenses 17 focusing the scan beam onto the photomultipliers 18. Therefore, this system is similar to the quotient-difference method of FIG. 2 except that each scene is separately scanned by the same flying-spot scanner beam. The electronic image signal from the photomultipliers 18 are fed to a pair of wide-band electronic amplifiers 19. The amplifiers 19 are of known electronic construction, and have the capability to receive a positive signal and send a positive signal, or receive a positive signal and send a negative signal, or vice versa. Therefore, it is not important whether the scenes are negative or positive transparencies as this feature will be controlled in the amplifier units 19. The amplifiers are so set up so that one feeds a positive output video electronic signal, whereas the other has a negative output video electronic signal. These output signals are fed into a standard summer unit 20, which summer sends the resultant difference signal to a display processor 21. The resultant video signal from the display processor is used to modulate the intensity of a change display 23, which shows the difference in the scenes compared.

In order to simply compare one scene or the other with the change display 23, a comparison monitor 22 is provided which can receive direct inputs from either scene through pickup lines 22a and 22b, and with the particular scene selected by means of selector switch 22c. If the switch 22c were moved alternately from one scene to the other the flicker technique described below could be utilized.

It is noted, that a common deflection circuitry 24 and raster generator 25 drive both the flying-spot scanner 15 and the comparison monitor 22 and the change display 23. The gain of the video channels is controlled so that a "no-difference" condition results in a gray level. A change in either scene will appear as a very light or very dark area depending upon the type of change and the scene in which it occurs. Therefore, this method is known as the video-difference method since it subtracts the video signals of each scene, whereas the quotient-difference method takes the quotient of the transmissivity of each scene.

Neither method has any obvious advantage over the other in its ability to detect changes and its sensitivity to changes, however, the video-difference method is probably better for the following reasons: 1. The quotient-difference method requires an extra step of photographic processing since both positive-and-negative-transparencies scenes are needed. 2. In the quotient-difference method, the photographic control of scene contrast adds an additional process. If the contrast of the unchanged areas is not equal for both scenes it is extremely difficult to make them cancel. This problem can be handled in the video-difference technique by simply changing the gain of one of the difference amplifiers following the photomultipliers to compensate for different contrast scenes. 3. In the video-difference detector, scanned readouts from each scene are available for electronic data processing to perform such filtering as may be required for shadow rejection, etc.

As described previously the difference detection technique cannot discriminate between changes that have occurred in the terrain and changes caused by such other things as the movement of shadows, clouds as well as seasonal variations, which would make variations in growth appear as changes on the readout display. Several methods are available to reject or filter certain unwanted changes from the display. One characteristic of shadows that can be used in a shadow rejection technique is their normal appearance as a very high density on a positive transparency, particularly under bright sunlight conditions when shadows are the greatest problem. The shadowed areas have the lowest transmissivity and are quite apparent. It is possible to insert a clipper into the video circuits to prevent the video signal obtained from each scene from going below a predetermined level of transmissivity. Such a level setting can be automated or it may be adjusted manually by viewing the output display and varying the clipper threshold level until the shadows disappear, or are at least lessened.

Clouds normally appear as a very low density on a positive transparency. The frequency content of data within the image of a cloud is normally very low compared to normal scene information. Rejection of scene information from clouds can be accomplished by clipping the video signal at a predetermined transmissivity level similar to the technique used for shadow rejection.

Seasonal and perspective changes between scenes are the most difficult to reject automatically, however, some seasonal changes such as foliage may be separated by conventional frequency filtering.

Although the amount of automatic decisioning that appears practical at this time is very limited, it is possible to develop an automatic readout detector that will locate certain types of changes. Although any method that is now developed will be limited to the very obvious changes, it may be helpful for certain screening operations that are now very time consuming and hence costly when performed by humans. The equipment could be designed to provide readout of positions of change and frame-number information to an electric typewriter or card punch to greatly speed up the process of photointerpretation. Although none of this is shown in the drawings, readout could be accomplished automatically by a probe method, or manually by the operator by a reticle method.

Although the amount of automatic decisioning that appears practical at this time is very limited, it is possible to develop an automatic readout detector that will locate certain types of changes. Although any method that is now developed will be limited to the very obvious changes, it may be helpful for certain screening operations that are now very time consuming and hence costly when performed by humans. The equipment could be designed to provide readout of positions of change and frame-number information to an electric typewriter or card punch to greatly speed up the process of photointerpretation. Although none of this is shown in the drawings, readout could be accomplished automatically by a probe method, or manually by the operator by a recticle method.

The change detector could also be combined with a conventional reconnaissance aircraft comparison guidance system, as shown in FIG. 4. The target change detector section of this apparatus is similar to that shown in FIG. 3 where a cathode-ray tube 26 scans a transparent reference film 27 through an objective lens 28 and is imaged onto a photomultiplier 29 by means of a condensing lens 30. The resultant signal from the photomultipler 29 is fed into a wide-band electronic amplifier 31. The film image 27 is coordinated to be exactly the same ground image as observed and picked up by a vidicon 32 through its optical system 33. A high-resolution radar or IR equipment could be used in place of the vidicon 32. The signal from the vidicon, which is positive, is fed into a wide-band electronic amplifier 34, and thence into a summer unit 35 where it is combined with a negative signal from the amplifier 31. The resultant difference signal from the summer unit 35 is used to modulate a cathode-ray tube 36. However, the resultant signal from the summer unit 35 could be used as a data link between the reconnaissance aircraft, if it were pilotless, and a predetermined recording station. The data-link system could be so set up that data-link information would only be sent when changes were noted by the detection system. This would greatly reduce the continuous and voluminous information now sent by data link by a pilotless reconnaissance aircraft.

The film 27 is driven, as by film drive motor 37, to give the proper comparison scene to be combined with the vidicon scene for target change detection. A switch 38 is provided to shift the vidicon signal from the amplifier 34 into an input in the cathode-ray tube 26. Another switch 39 is provided to shift the signal from the photomultiplier 29 and direct it to a comparison guidance system 40. Switches 38 and 39 are normally in the up position, as indicated in FIG. 4, for the target change detector section, and in the down position 4 for the comparison guidance system. The comparison guidance system compares the picture of the surface terrain as imaged by the vidicon 32 with the picture on the film 27 to guide the reconnaissance aircraft over exactly the same territory as recorded previously on the film 27. A raster generator 41 feeds the deflection circuits 42, with the deflection circuitry 42 being common to the vidicon 32, the cathode-ray tube 26, and the cathode-ray tube 36.

A further method of target change detection would be to backlight two transparent negatives or positives in registration, and superimpose the images. Then, the backlighted transparencies would be alternately flickered at approximately 1½ cycles per second so that any differences thereon would result in a flicker appearing on the superimposed projected images. Areas where no change occurred would remain steadily lighted. A further refinement of this backlighted method would be to backlight with two different colors, superimpose the registered images, and note color differences on the superimposed projected images which would denote target changes.

Any or all of the aforementioned comparison and difference detector methods could be utilized in one machine application so that transparencies could be compared in several different manners, or so that electronic displays stored in an electronic image storage tube could be compared, or so that an actual televised picture could be compared with an electronic stored image, or a film stored image. However, an automatic target change detection system is an essential apparatus to insure proper interpretation of the growing volumes of surveillance and reconnaissance pictures taken by the various methods in use today. This system described herein has proved in experimental use that it will reduce the number of personnel required by today's standard by at least five times, and that the personnel required to operate the equipment would not have to be as highly skilled as the photointerpreter today. Also, the average skilled photointerpreter still misses about 33 percent of the changes or differences in reconnaissance pictures whereas under actual tests the systems herein proposed has allowed only 3.2 percent of the changes to go undetected, and this could be further reduced by using the flicker technique in conjunction with the video-difference method.

While in accordance with the Patent Statutes one best known embodiment of the invention has been illustrated and described in detail, it is to be particularly understood that the invention is not limited thereto or thereby, but that the inventive scope is defined in the appended claims.

What is claimed is:

1. In a target change detector adapted for combination with a reconnaissance aircraft, the combination of a reference transparent scene film, a film drive means, a cathode-ray tube adapted to scan the total area of the transparent film with normal raster technique, a photomultiplier adapted to receive the scanning beam of the cathode-ray tube through the transparent film, lens means to properly direct the scanning beam of the cathode-ray tube to the transparent film and to the photomultiplier to produce video signals, a vidicon adapted to electronically image a comparison scene of the earth beneath the aircraft and produce video signals, a pair of wide-band electronic amplifiers adapted to receive the video signals from the vidicon and the photomultiplier respectively, the amplifier for the vidicon being set for a positive output signal, the amplifier for the photomultiplier being set for a negative output signal, a summer unit adapted to receive the video signals of opposite polarity from the amplifiers to produce a difference signal, said difference signal being the difference between the reference transparent film signal and the comparison vidicon signal, a comparison guidance system section adapted to compare the vidicon image with the film image to keep the aircraft flying on the proper course, switch means between the vidicon and its amplifier, said switch adapted to switch the vidicon signal to the cathode-ray tube input, switch means between the photomultiplier and its amplifier, said second-mentioned switch adapted to shift the photomultiplier signal to the comparison guidance system and means to change the switches synchronously together to change the apparatus from the change detector section to the comparison guidance system.

2. In a target change detector adapted for combination with a reconnaissance aircraft, the combination of a reference scene, a cathode-ray tube adapted to scan the scene, a photomultiplier adapted to receive the scanning beam of the cathode-ray tube to produce video signals, means to electronically image a comparison scene of the earth beneath the aircraft and produce video signals, a pair of wide-band electronic amplifiers adapted to receive the video signals from the electronic image means and the photomultiplier respectively, the amplifier for the electronic image means being set for a positive output signal, the amplifier for the photomultiplier being set for a negative output signal, a summer unit adapted to receive the video signals of opposite polarity from the amplifiers to produce a difference signal, said difference signal being the difference between the reference scene and the comparison electronic image signal, a comparison guidance system section adapted to compare the electronic image with the scene to keep the aircraft flying on the proper course, switch means between the electronic image means and its amplifier, said switch adapted to switch the electronic image signal to the cathode-ray tube input, switch means between the photomultiplier and its amplifier, said second-mentioned switch adapted to shift the photomultiplier signal to the comparison guidance system and means to change the switches synchronously together to change the apparatus from the change detector section to the comparison guidance system.